United States Patent Office 3,214,263
Patented Oct. 26, 1965

3,214,263
TREATMENT OF HAEMATITE IRON ORE FOR USE IN THE PRODUCTION OF IRON
Henry L. O'Connor, Burnpur, India, assignor to The Indian Iron & Steel Company Limited, Calcutta, India, a company of India
No Drawing. Filed Sept. 29, 1964, Ser. No. 400,247
5 Claims. (Cl. 75—3)

This application is a continuation-in-part of application Serial No. 221,339, filed September 4, 1962, now abandoned.

This invention relates to the briquetting of haematite iron ore "fines" to enable charging of said ore into a blast furnace or the like.

An object of the invention is to provide briquettes which are strong enough to withstand the pressures of the furnace burden and are durable at high temperatures.

Another object of the invention is to provide briquettes which result in an increase in the thermal efficiency of the furnace into which they are charged.

An example embodying the invention will now be described.

EXAMPLE

Haematite iron ore "fines" (currently ore bodies under ½ inch in size) are crushed and ground to pass 1/16 inch British Standard Screen. Burnt lime is slaked to produce calcium hydroxide $Ca(OH)_2$, and the latter is dried and then crushed to pass 1/16 inch B.S.S. Foamed blast-furnace slag is dried, and crushed to pass 1/16 B.S.S. Weighed amounts of the crushed ore, slaked lime and slag are put into a dry mixer plant with a weighed amount of silica sand, and the components are very thoroughly admixed to form a dry agglomerate. The dry agglomerate or mix is then put in a wet mixer plant and a measured quantity of water is added. When the wet mixing is complete, the wet mix is briquetted in moulds under pressure and the briquettes are placed in a drying shed wherein the air dries them to cause initial setting of the cementitious content of the briquettes. This drying step may last 1 to 4 days, and usually lasts about 2 to 3 days. At the beginning of this drying step the calcium hydroxide gradually loses water and becomes plastic. As the drying continues the plastic calcium hydroxide begins to act as a low-temperature bonding medium, the degree of bonding varying inversely with the water content. Usually after about 2 to 3 days of this air drying the cement is sufficiently hard and the bond strong enough to permit handling of the briquettes, the bonding effect being due to the calcium hydroxide forming colloidal hydration products ("gels" and "hydrogels") with the monosilicate of lime in the slag and also with the sand. The dried briquettes are passed into a steam chamber where they are subjected to the action of steam at about 120° C. for about 6 to 8 hours. It is found that said steam treatment causes a large increase in the formation of said colloidal hydration products without destroying their jelly-like nature and without creating sufficient moisture to swell the "ungelled" calcium hydroxide, reduce the porosity of the briquette and destroy the initial colloidal bond. The bonding effect is thus greatly enhanced and is found to be durable at temperatures up to about 300° C. The briquettes are finally passed to a shed wherein the air dries them to cause hardening of the cement. They are then removed to storage bunkers at the blast furnace plant.

The following compositions of the components used are given by way of example only. The percentages are by weight.

|  | "Foamed" blast furnace slag, percent | Blast furnace slag range, percent |
|---|---|---|
| $SiO_2$ | 31.40 | 30–32.5 |
| $Al_2O_3$ | 28.40 | 27.8–29.5 |
| CaO | 33.30 | 31.9–35.5 |
| MgO | 3.92 | |
| Fe | 1.10 | |
| Sul | 1.02 | |
|  | 99.14 | |

|  | Haematite iron ore (as received), percent | Lime, percent |
|---|---|---|
| Moisture | 3.50 | 5.36 |
| $SiO_2$ | 1.55 | 5.36 |
| $Al_2O_3$ | 4.87 | 2.26 |
| CaO |  | 80.90 |
| MgO | 0.14 |  |
| Fe | 58.20 | 0.86 |
| Sul | tr |  |
| Phos | 0.07 |  |
| Loss (Carbonic acid and combined water) | [1] 4.80 | 10.62 |

[1] Difference.

By way of example only, the composition of the wet briquette mix before pressing is as follows:

Percent (by weight)
Foamed slag _____ 8.0
Slaked lime _____ 11.0
Haematite ore "fines" _____ 78.5
Silica sand _____ 2.5
                                                100.0

Water addition, 10.5% of the combined weight of ingredients.

The briquettes are of sufficient strength to enable them to withstand the handling, the charging into the furnace and the pressures of the furnace burden; they are of a size and shape which facilitate the passage of the furnace reducing agents and reducing gases between the individual briquettes; they have a porous structure which enables free penetration of the furnace reducing gases into the ore; and they are free of sulphur-compound additives which are considered most objectionable in modern iron manufacture.

The briquettes are fed into a blast furnace, and in passage of the briquettes downwards through the blast furnace, the reduction temperature gradually increases until the high-temperature major reduction zones are reached.

Practically all the iron of the ore fines is in the ferric state. By virtue of the existence of the unattached hydrated lime in the briquettes the formation of calcic ferrites of the type $xCaO\text{—}Fe_2O_3$ is promoted within the mass of the briquettes under the increasing temperatures in the furnace. In this way additional bonding is produced in the briquettes. Moreover, with the ferric oxide in combination with the lime, the identity of the ferric oxide is maintained until the high-temperature reaction zones are reached in the furnace. While ferric oxide by itself becomes unstable at comparatively low temperatures (below 500° C.) according to the balanced reaction:

$$4Fe_2O_3 = 2Fe_3O_4 + 2FeO + O_2$$
(Ferric oxide)  (Magnetite)  (Ferrous oxide)

ferric oxide in combination with lime, in the form of dicalcic ferrite ($2CaO \cdot Fe_2O_3$), is stable up to about 1420° C., and in the form of monocalcic ferrite $$(CaO \cdot Fe_2O_3)$$

is stable up to fully 1200° C. The calcic ferrites thus dissociate in the high-temperature zones.

By preserving the identity of the ferric oxide in combination until the briquettes reach the high-temperature zones, reductions of the ore to iron by the exothermic reactions with carbon monoxide and by the most favourable endothermic reaction with carbon are increased, with consequent thermal advantage to the coke consumption rate and to the iron production rate of the furnace.

In a normal blast-furnace, the principal reducing agents are carbon monoxide and carbon, and the temperatures of the successive low-temperature reduction reactions range approximately from 470° C. to 700° C.

The heat consumption for the low-temperature reduction of iron from the three oxides of iron is lowest in the case of ferric oxide and highest in the case of magnetite. Thus:

*Reactions with carbon monoxide*

(1) $2Fe_2O_3 + 8CO = 7CO_2 + 4Fe + C$
$-(2 \times 357300) - (8 \times 52488) + 7(174960) = +90216$ B.t.u. (exothermic)

(2) $3Fe_2O_3 + CO = 2Fe_3O_4 + CO_2$
$-(3 \times 357300) - (52488) + 2(478800) = +8172$ B.t.u. (exothermic)

(3) $Fe_3O_4 + CO = 3FeO + CO_2$
$-(478800) - (52488) + (3 \times 115940) + (174960) = -9108$ B.t.u. (endothermic)

(4) $FeO + CO = Fe + CO_2$
$-(115740) - (52488) + 174960 = +6732$ B.t.u. (exothermic)

*Reactions with carbon*

(2a) $3Fe_2O_3 + C = 2Fe_3O_4 + CO$
$-(3 \times 357300) + (2 \times 478800) + 52488 = -61812$ B.t.u. (endothermic)

(3a) $Fe_3O_4 + C = 3FeO + CO$
$-(478800) + 3(115740) + 52,488 = -79092$ B.t.u. (endothermic)

(4a) $FeO + C = Fe + CO$
$-(115740) + 52488 = -63252$ B.t.u. (endothermic)

Hence the reductions of ferric oxide ($Fe_2O_3$) and ferrous oxide (FeO) by carbon monoxide give off heat, while the reduction of magnetite ($Fe_3O_4$) consumes heat—compare Reactions 1, 2 and 4 with 3.

The reductions of all these oxides by carbon consume heat, but consumption is lowest in the case of ferric oxide and highest in the case of magnetite.

By partial fixation of $Fe_2O_3$ by CaO in a finely ground, porous and consolidated mixture, its reduction is delayed until the high-temperature zones are reached, and then reduction is effected with the minimum formation of magnetite, that is, by the maximum use of the exothermic reactions with carbon monoxide, and use is made of the most favourable endothermic reaction with carbon, that is, as in (2a) above.

By way of example only, the physical properties of the briquettes produced are given:

(1) Shatter index (duplication of the coke shatter standard):
   Retained on—
   Plus 2 inch screen, 91–98%
   Plus ½ inch screen, 94–99%
   Minus ½ inch screen, 1–6%

(2) Crushing strength:
   1300 to 2700 lbs. per square inch (3) Porosity, 33% average (4) Chemical analysis:

| | Percent |
|---|---|
| $SiO_2$ | 8.3 |
| $Al_2O_3$ | 7.9 |
| $CaO(OH)_2$ | 15.2 |
| $MgO(OH)_2$ | 0.8 |
| $Fe_2O_3$ | 63.7 |
| Uncombined water—diff. | 4.1 |
| | 100.0 |

It will be clear that the invention provides a method for the disposal and economic use of haematite ore "fines," which at the present time are frequently regarded as waste ore.

The invention further provides a novel process for the effective usage of haematite ore fines without the application of heat external to the blast furnace. In this the invention differs materially from current forms of ore preparation such as pelletisation and sintering of the fine ores.

I claim:

1. A method of manufacturing briquettes for charging into a blast furnace in the production of iron, comprising forming an intimately mixed agglomerate of dry, finely ground haematite ore fines and a dry, finely ground cement including hydrated lime and foamed blast furnace slag, the hydrated lime so predominating in the cement that the slag is capable of forming a cementitious material with only part of the hydrated lime while leaving the remaining part free, wet-mixing the aggregate with water, moulding the wet mix under pressure to form the briquette, drying the briquette in air for a period of 1 to 4 days to cause initial setting of the cement, subjecting the dried briquette for a period of about 6 to 8 hours to the action of steam at about 120° C. to substantially increase the formation of said cementitious material without destroying the initial set and without destroying the porosity of the briquette, and finally drying the steamed briquette in air to harden the cement so that the cement forms a strong, hard, porous matrix for the ore fines thereby enabling handling of the briquette and the charging of same into the blast furnace where it withstands the pressures of the furnace burden, the free lime content of the cement being available for reaction with the ferric oxide content of the ore fines under the furnace heat to form ferric calcites of the type $XCaO \cdot Fe_2O_3$ which assist in the preservation of the briquettes against disintegration and maintain the identity of the ferric oxide until the briquette reaches a high-temperature reaction zone in which the optimum reducing reactions occur.

2. The method according to claim 1, wherein the dry, finely ground cement is free of sulphur-compound additive.

3. The method according to claim 2, wherein the dry, finely ground cement includes silica sand.

4. The method according to claim 3, wherein the wet mix before moulding has an approximate composition as follows:

| Ingredient | Percent (by weight) |
|---|---|
| Foamed slag | 8.0 |
| Slaked lime | 11.0 |
| Silica sand | 2.5 |
| Haematite ore "fines" | 78.5 |
| | 100.0 |

Water addition, 10.5% of the combined weight of ingredients.

5. The method according to claim 1, wherein the briquette is dried in air for a period of about 2 to 3 days to cause the initial setting of the cement.

References Cited by the Examiner

UNITED STATES PATENTS

| | | | |
|---|---|---|---|
| 859,411 | 7/07 | Schumacher | 75—3 |
| 900,587 | 10/08 | Ramsay et al. | 75—3 |
| 1,238,022 | 8/17 | Kippe | 75—3 |

FOREIGN PATENTS 517,867  2/40  Great Britain.

BENJAMIN HENKIN, *Primary Examiner.*